J. HARRIS.
Car Coupling.
No. 52,410.
Patented Feb. 6, 1866.
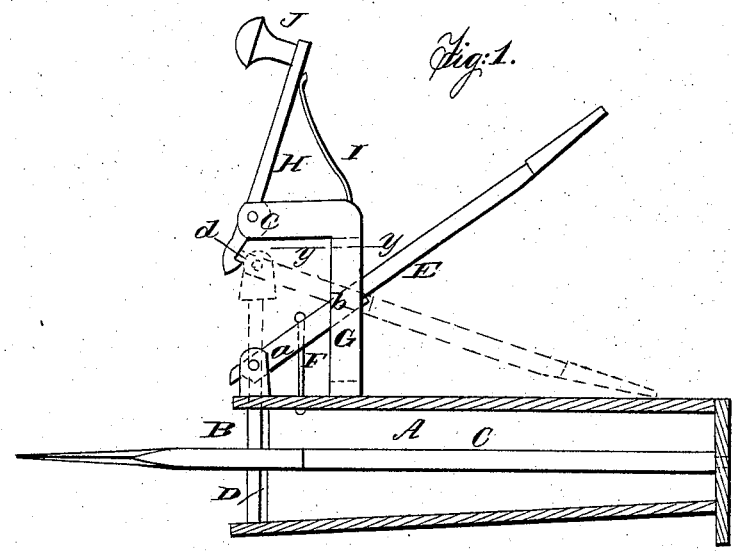
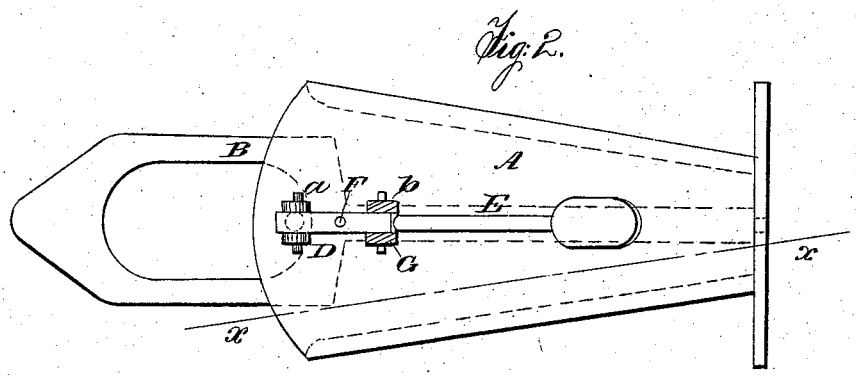

UNITED STATES PATENT OFFICE.

J. HARRIS, OF GREEN LAKE, WISCONSIN.

IMPROVED CAR-COUPLING.

Specification forming part of Letters Patent No. 52,410, dated February 6, 1866.

*To all whom it may concern:*

Be it known that I, J. HARRIS, of Green Lake, in the county of Green Lake and State of Wisconsin, have invented a new and Improved Car-Coupling; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, Fig. 2; Fig. 2, a plan sectional view of the same, taken in the line $y\ y$, Fig. 1.

Similar letters of reference indicate corresponding parts.

This invention relates to a new and improved self-acting car-coupling, or one which couples itself when the draw-heads of two adjoining cars come in contact.

The object of the invention is to obtain a car-coupling of the class specified, which may be readily uncoupled when desired, and all the draw-heads or those at both ends of a car, arranged precisely alike, so that cars may be coupled without reference to which ends adjoin each other, or, in other words, may be coupled regardless of which ends chance to come in contact.

A represents a draw-head, which may be attached to the car in the usual or in any proper manner, and provided with a link, B, which is secured to the draw-head by a bar, C, extending longitudinally through it, the link projecting out in front of the draw-head and having a pointed or V-shaped end. (See Fig. 2.)

D represents a coupling-pin, which passes loosely through a hole in the front part of the upper plate of the draw-head, and has its lower end fitting in a hole in the bottom plate of the same. The upper end of this pin is connected, by a pivot, $a$, with a foot-lever or treadle, E, to which a spring, F, is attached, the lever or treadle E having its fulcrum $b$ in an upright or standard, G, on the draw-head, and the spring F may be a spiral one, or any other kind may be used. The spring F, it will be seen, has a tendency to keep the pin D down in the front part of the draw-head.

The standard G, at its upper part, is bent over to a horizontal position, extending toward the front of the draw-head, and has a bar, H, secured to it by a pivot-bolt, $c$. The lower end of this bar H is notched to form a catch, $d$, and the upper part of the bar has a spring, $i$, bearing against it, and a knob, J, is attached to the upper end of the bar, said knob projecting from the front side of the bar at right angles, as shown in Fig. 1.

By depressing the foot-lever or treadle E the pin D will be raised up, out from the link B, and will be retained in an elevated position by the catch-bar H, which engages with the front end of the lever or treadle E, as shown in red in Fig. 1. When the parts are in this position the draw-heads of two adjoining cars are in a condition for coupling, and as the draw-heads approach each other the knobs J of the two bars H will come in contact and the front ends of the foot-levers or treadles E will be released from the bars H, and the springs F will force down the pins D through the links of both draw-heads, the link of one draw-head passing into the other draw-head. The draw-heads may be disconnected at any time by pressing down the foot-levers or treadles E so as to raise the pins D.

Having thus described my invention, what I claim as new, and desire to secure by Letters Patent, is—

The link B, attached to the draw-head A, in connection with the drop or coupling pin D, foot-lever or treadle E, and catch-bar H, all arranged and combined to operate substantially in the manner as and for the purpose herein set forth.

JOHN HARRIS.

Witnesses:
S. H. PALMER,
S. R. DAVIS.